United States Patent [19]
Kelley

[11] Patent Number: 5,226,262
[45] Date of Patent: Jul. 13, 1993

[54] SUSPENDABLE WIND BARRIER FOR STADIUM

[76] Inventor: Richard R. Kelley, 300 Dedalera Dr., Portola Valley, Calif. 94028

[21] Appl. No.: 954,947

[22] Filed: Sep. 30, 1992

Related U.S. Application Data

[63] Continuation of Ser. No. 683,355, Apr. 9, 1991, abandoned.

[51] Int. Cl.[5] .......................................... E04H 3/10
[52] U.S. Cl. ........................................... 52/6; 52/63; 52/2.25; 40/214; 405/63
[58] Field of Search ............... 52/6, 2.17, 2.22, 2.25, 52/63; 40/214; 405/63

[56] References Cited

U.S. PATENT DOCUMENTS

| | | |
|---|---|---|
| 635,697 | 10/1889 | Menkens . |
| 829,640 | 8/1906 | Erickson . |
| 1,478,034 | 10/1923 | Hortz . |
| 1,773,707 | 8/1930 | Shearer . |
| 1,945,785 | 2/1934 | Neal ............................... 40/214 |
| 2,850,026 | 9/1958 | Leatherman . |
| 3,335,535 | 8/1967 | Lane ............................... 52/63 |
| 3,489,072 | 1/1970 | Secor . |
| 3,974,756 | 8/1976 | Long . |
| 4,257,199 | 3/1981 | Kuboyama . |
| 4,534,675 | 8/1985 | Morrisroe ....................... 405/63 |
| 4,688,024 | 8/1987 | Gadde ............................ 405/63 |
| 4,738,563 | 4/1988 | Clark .............................. 405/63 |

Primary Examiner—Carl D. Friedman
Assistant Examiner—Wynn Wood
Attorney, Agent, or Firm—Townsend and Townsend Khourie and Crew

[57] ABSTRACT

A continuous curtain for surrounding a stadium and to extend upwardly from the upper margin of the stadium so as to minimize lateral wind forces and thereby eliminate erratic wind currents on or above the playing field of the stadium. The curtain has a number of side-by-side panels with each panel being porous or having holes therethrough to permit limited flow of air through the panels. The panels are suspended from a location above the stadium and extend downwardly to ground level in generally vertical planes. The upper margins of the panels are spaced well above the upper margin of the stadium, and the curtain is open at the top of the wind barrier. Thus, the interior of the space surrounded by the curtain is not closed to the upper hemisphere. The suspending structure for the curtain is buoyant in air and is held down by cables extending downwardly from the buoyant structure to the ground. The buoyant structure can be helium-filled balloons which are supplied by helium from helium sources at ground level.

16 Claims, 3 Drawing Sheets

SUSPENDABLE WIND BARRIER FOR STADIUM

This is a continuation of application Ser. No. 07/683,355, filed Apr. 9, 1991, now abandoned.

This invention relates to improvements in the blocking or attenuating of wind forces around and about buildings and the like, and, more particularly, to a wind barrier for minimizing wind forces around a stadium.

BACKGROUND OF THE INVENTION

In a sports stadium, such as Candlestick Park of San Francisco, California, a playing field is surrounded by a concrete superstructure which contains seats to be occupied by spectators of the sport being played on the playing field. As in other stadiums around the country, Candlestick Park is located near land and water areas which give rise to the generation of wind currents. Such wind currents are known to change rapidly and erratically in velocity and direction. Moreover, such wind currents can have an adverse effect in many cases on the play of the game on the playing field of the stadium.

For instance, a baseball hit as a fly ball into the outfield of Candlestick Park is known to be subjected to high winds well above the playing field, and the fly ball will be substantially uncatchable or cannot be caught. This is because the erratic winds, in some cases, deflect the ball and carry it higher and deeper or, in other cases, carry it more shallow than the normal flight of the ball. The ball thus falls as a fair ball and the game suffers because the ball would ordinarily have been caught by an outfielder of average skill but for the presence of the winds.

Stadiums subject to such wind conditions typically in late afternoon or at night during summer months have greater difficulty attracting customers because of these cold, fog-driven winds. Modern baseball is played primarily at night to accommodate working fans and television schedules.

To avoid the problems of the type described, improvements to a stadium are needed to minimize the effects of erratic wind currents. The present invention provides a solution to such a need.

Prior disclosures in this field include the following U.S. Pat. Nos.:

635,697 2,850,026
829,640 3,489,072
1,478,034 3,974,756
1,773,707 4,257,199
1,945,785

SUMMARY OF THE INVENTION

The present invention is directed to a continuous curtain for surrounding a stadium and to extend upwardly from the upper margin of the stadium to minimize lateral wind forces and thereby eliminate erratic wind currents on or above the playing field of the stadium. To this end, the curtain of the present invention is provided with a number of side-by-side panels with each panel being porous or having holes therethrough to permit limited flow of air through the panels.

The panels are suspended from a location above the stadium and extend downwardly to ground level in generally vertical planes. The upper margins of the panels are spaced well above the upper margin of the stadium, and the curtain is open at the top of the wind barrier. Thus, the interior of the space surrounded by the curtain is not closed to the upper hemisphere.

The suspending structure for the curtain is buoyant in air and is held down by cables extending downwardly from the buoyant structure to the ground. The buoyant structure typically is comprised of helium-filled balloons which are supplied by helium from helium sources at ground level.

The primary object of the present invention is to provide an improved wind barrier for a stadium to prevent erratic wind currents from being generated in the stadium and especially on a playing field so as to normalize the play of the game which otherwise would be adversely affected by the presence of erratic wind currents.

Other objects of the present invention will become apparent as the following specification progresses, reference being had to the accompanying drawings for an illustration of the invention.

BRIEF DESCRIPTION OF THE DRAWINGS

FIG. 4 is an enlarged, fragmentary side elevational view of the porous fabric panel forming a major portion of the wind barrier of the present invention.

DETAILED DESCRIPTION OF THE INVENTION

Figure 1:
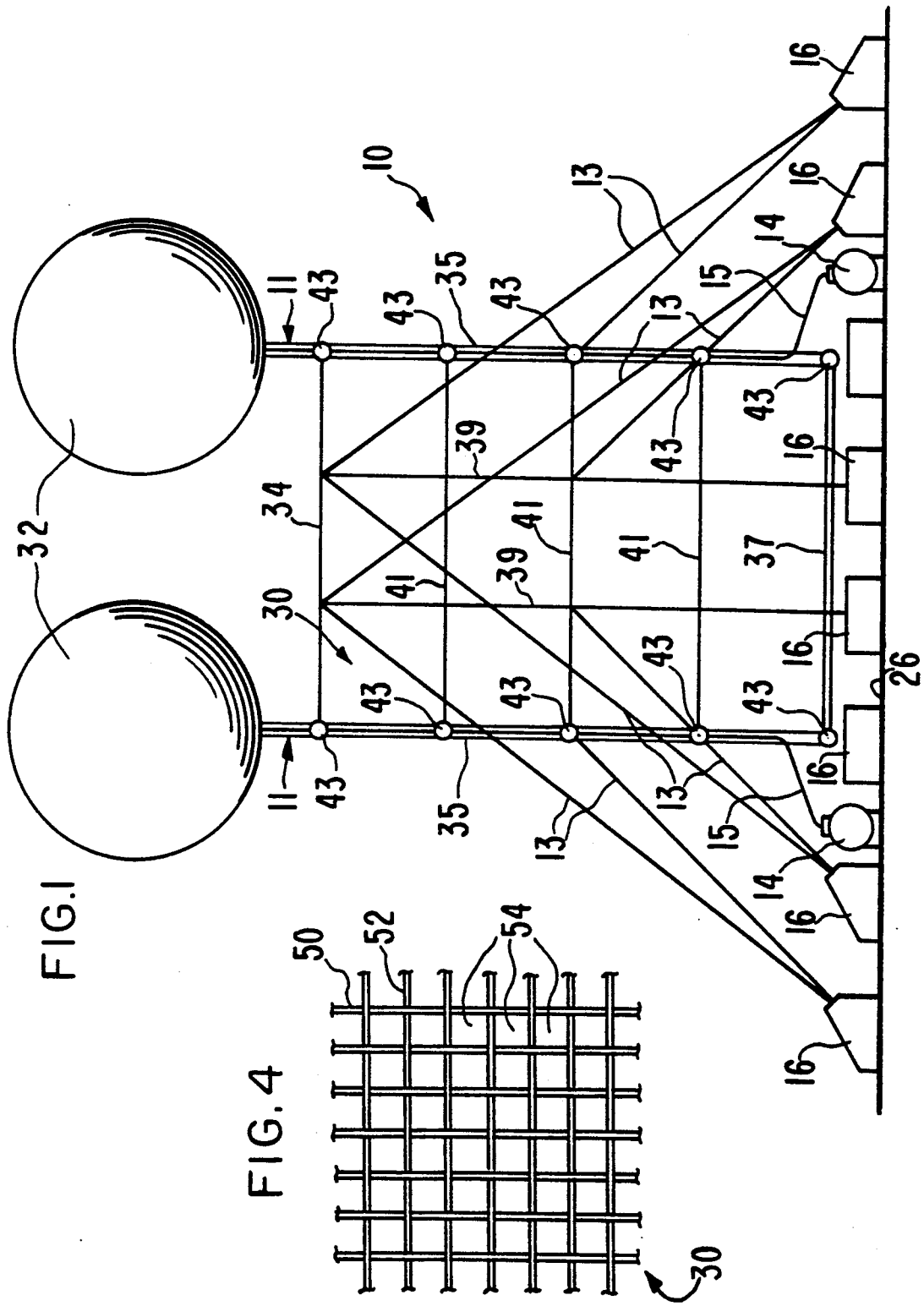
FIG. 1 is a schematic view of one portion of a suspendable wind barrier for a stadium which forms the subject matter of the present invention.
Figure 2:
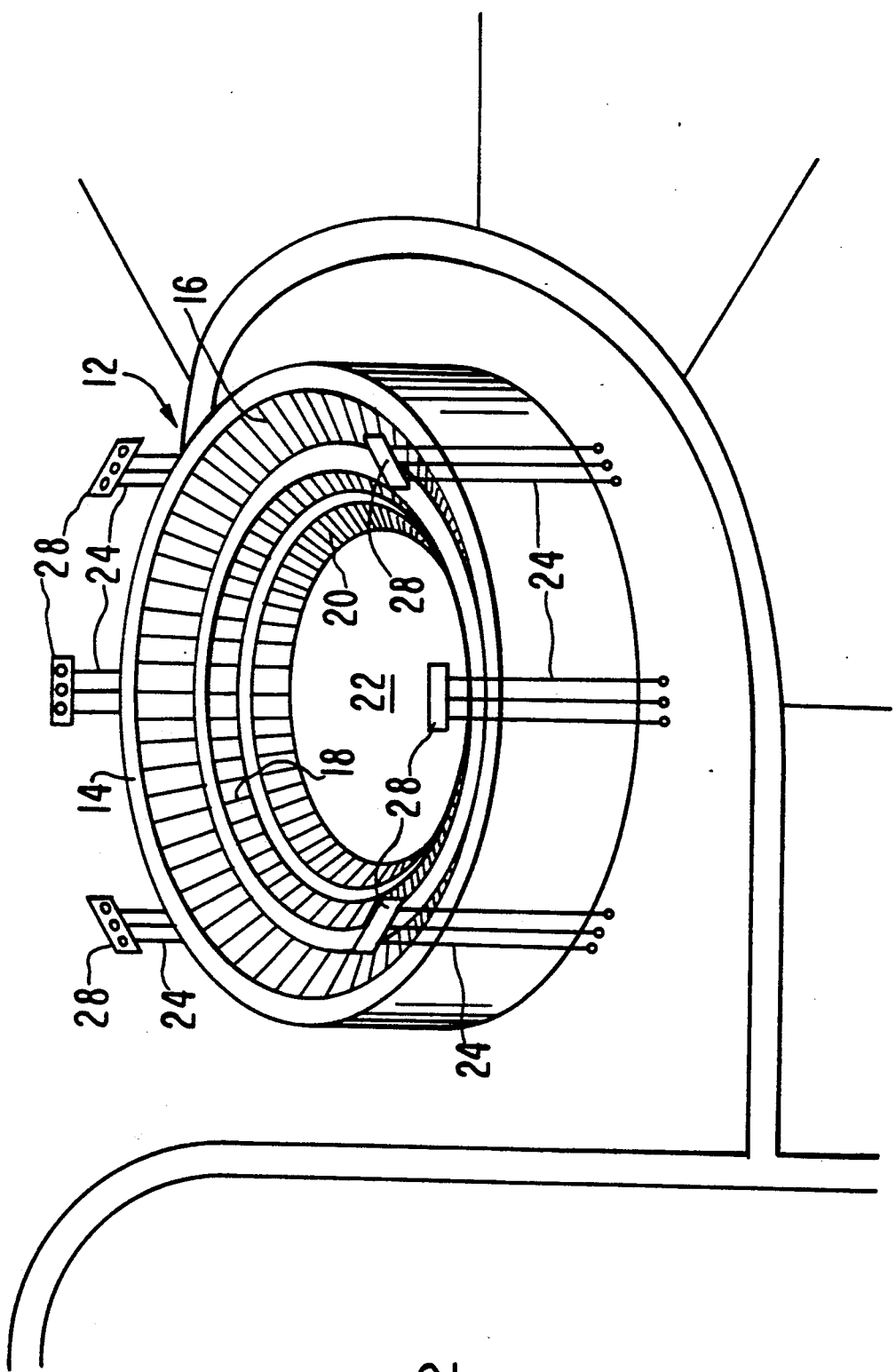
FIG. 2 is a schematic perspective view of a stadium before the wind barrier is applied thereto.
Figure 3:
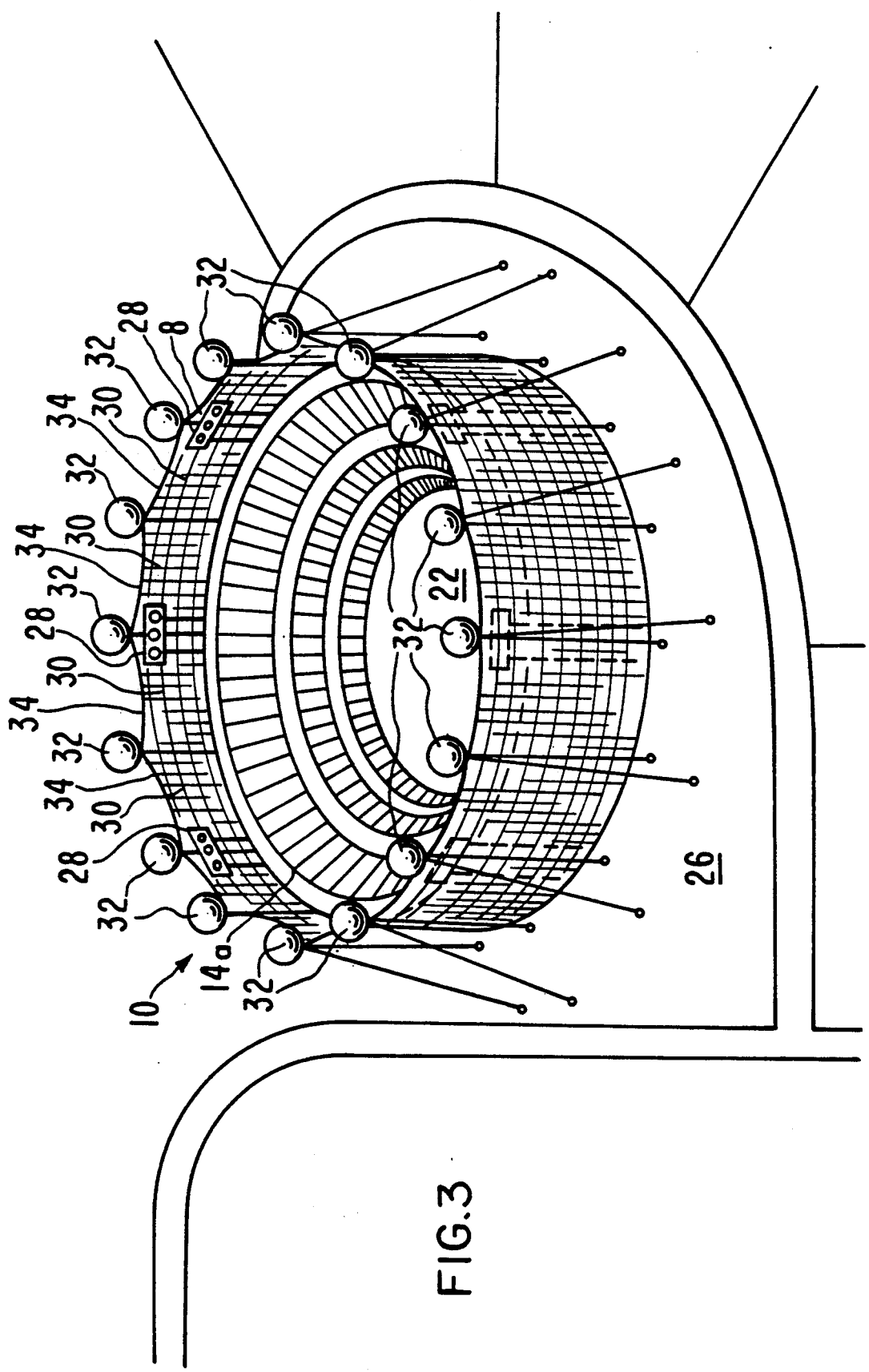
FIG. 3 is a view similar to FIG. 2 but showing the wind barrier coupled to the stadium.

The suspendable wind barrier of the present invention is broadly denoted by the numeral 10 and is illustrated in FIGS. 1, 3 and 4. Wind barrier 10 is especially suitable for use with a stadium 12 (FIG. 2) which has an uppermost margin 14 defining the upper boundary of the stadium. The upper margin 14 extends continuously about an upper tier 16 of seats, the upper tier 16 is above an intermediate seat tier 18 and lower seat tier 20 surrounding playing field 22 of the stadium. Light standards 24 extend upwardly from ground level 26 surrounding the stadium, and lights 28 are at the upper ends of the light standards as is conventional for lighting playing field 22.

In some stadiums, the wind flowing exteriorly of the stadium flows over the upper margin 14 and down into the playing field to cause erratic wind currents and strange, unpredictable movements of game balls, such as baseballs, footballs and the like. It is a purpose of suspendable wind barrier 10 to substantially minimize such erratic wind currents and to allowing the wind currents to be on or above the playing field 22 in a substantially normal fashion, i.e., not erratic. The description of wind barrier 10 will be made hereinafter with respect to its application to and use with stadium 12.

As shown in FIG. 3, wind barrier 10 includes a substantially continuous curtain 8 comprised of a plurality of porous fabric panels 30. Panels 30 are suspended in generally vertical planes by helium filled, rubber-lined balloons or buoyant means 32 such that the panels 30 form continuous curtain 8 surrounding the stadium 12 and extending well above the upper margin 14 of the stadium. The curtain 8 of porous fabric panels 30 generally is outside of the perimeter containing the light standards and the upper marginal edges 34 of the fabric panels. Panels 30 are also generally above the lights 28 so that the light from the light standards is not diminished by the panels being in front of the lights. The curtain 8 of panels 30 extends to ground level 26 as shown in FIG. 3, and the curtain is anchored on the ground in a manner described with respect to FIG. 1.

Each panel 30 has its upper marginal edge 34 between the upper ends of a pair of side marginal edges 35 and the lower ends of a bottom marginal edge 37 (FIG. 1). Side marginal edges 35 and bottom marginal edge 37 are coupled to crisscrossing cables 39 and 41, respectively, and such cables reinforce panel 30 which will be quite heavy and unwieldy without some control stiffening of the fabric of the material.

The side marginal edges 35 of each panel 30 are coupled by pivotal fasteners 43 of any suitable construction, such as fasteners which permit some articulation or movement of the panel relative to cables 11 which couple the balloons 32 with a base 16 mounted at ground level 26. A fastener 43 is mounted directly above a corresponding base 16, and the bases 16 operate to anchor the vertical reinforcing cables 39 coupled to the adjacent panel 30 to ground level.

Tank 14 containing helium is provided adjacent to each cable 11 and supplies helium along a along a line 15 to the corresponding balloon 32. Additional bases 16 are used to anchor inclined, tie-down cables 13 which are coupled to the upper and intermediate cables 41 and 39 to stabilize the panel 30 and anchor it permanently to ground level 26.

Panel 30 is particularly porous in construction and is shown in FIG. 4 as being made up of a plurality of vertical threads 50 and a plurality of horizontal threads 52, the threads being woven in such a way that the panel has air openings 54 therethrough which permit the wind to pass through the panel and not to be completely stopped by the panel. Thus, the effect of the panel is to reduce the speed of the wind and thereby reduce its harmful effects rather than to create a completely impervious barrier to the wind which might otherwise deaden the space surrounding the playing field 22 (FIG. 1) and which would adversely affect the play of the game on the game field 22. The curtain significantly reduces wind speed without having the curtain panels carry the full impact of the wind, like a sail, as would be the case of solid non-porous panels for the curtain.

In use, the curtain 8 of panels 30 will be erected and suspended from helium balloons 32 while helium is continuously supplied from tanks 14 through tubes 15 to the balloons 32. The panels 32 will extend above the top rim 14 of the stadium and will surround the field and present an open top for the curtain, which open top is above the light fixtures and the light standards. The fabric material making up the panels will be porous so as to reduce lateral wind loads. Thus, the erratic winds can flow laterally through the panels 30 and into the stadium and be transformed into winds which are less erratic. This condition will be apparent because the wind speed will be greatly reduced and will have very little effect on the playing of a game on the game field 22.

The presence of the curtain of panels 30 will not interfere with the ingress and egress of spectators in the stadium, and the perforate or porous nature of the panels 30 will not permit the curtain of panels to act as a smokestack which would tend to draw objects upwardly with aspirating effect due to the movement of air across the open top of the panel curtain.

The panels 30 of curtain 8 are interconnected at their side margins so that there is substantially continuous curtain construction about the stadium itself. The panels are interconnected by a fastening means which permits some limited articulation of the panels relative to each other yet the panels have holes therethrough to permit some limited air flow through the panels to thereby prevent complete stoppage of air flow onto the open top of the stadium and down and onto the playing field.

What is claimed is:

1. A wind barrier for a stadium having an open top and an outer periphery comprising:
   a porous curtain having a length to allow the curtain to extend about the outer periphery of the stadium; and
   means coupled with the curtain for suspending the curtain from a location above the stadium.

2. A wind barrier as set forth in claim 1, wherein said curtain includes a plurality of panels of porous fabric material, the panels being in side by side relationship and allowing limited air flow through the panels.

3. A wind barrier as set forth in claim 2, wherein the panels are generally arranged in respective vertical planes.

4. A wind barrier as set forth in claim 2, wherein adjacent panels have side margins shiftably coupled with each other, whereby the panels can articulate with respect to each other.

5. A wind barrier as set forth in claim 2, each of said panels having a pair of opposed side margins, and fastener devices for the connection of adjacent side margins of said panels together, whereby the panels can articulate relative to each other.

6. A wind barrier as set forth in claim 1, wherein said suspending means includes a number of helium balloons for each panel, respectively, and means for supplying helium to the balloons.

7. A wind barrier as set forth in claim 6, wherein the means for supplying helium to the balloons includes a helium source located at ground level, and tube means for coupling the source to the balloons.

8. A wind barrier as set forth in claim 1, each panel being shiftably mounted by fastener means to the tube means coupling the helium source to the balloons.

9. A wind barrier as set forth in claim 1, wherein is included a stadium having an outer periphery, said curtain extending at least partially about the outer periphery of the stadium.

10. A wind barrier as set forth in claim 1, wherein is included a stadium having an outer periphery and an upper margin, said wind curtain extending around the outer periphery of the stadium and extending above the upper margin of the stadium.

11. A wind barrier as set forth in claim 1, wherein is included cable means for stabilizing the curtain.

12. A wind barrier as set forth in claim 11, wherein said curtain includes a number of panels, said stabilizing means including a number of cables for reinforcing the panels.

13. A wind barrier as set forth in claim 11, said stabilizing means includes tie-down means for coupling the curtain to the ground.

14. A wind barrier for a stadium as set forth in claim 1, wherein the curtain is comprised of a plurality of panels, each panel having an upper marginal edge, a lower marginal edge, and a pair of spaced, generally vertical side marginal edges extending from the upper marginal edge of the panel to the lower marginal edge thereof, there being a side cable extending along each side marginal edge of each panel, respectively, the cable being coupled to the side marginal edges of respective panels, there being a balloon on the upper end of the cable, said coupling means coupling the upper marginal edge of each panel to the respective side cables, whereby the panels are suspended by the cables in generally vertical planes extending from the location near the respective balloons to a location near ground level.

15. A wind barrier as set forth in claim 14, wherein each panel is formed from a fabric material having holes therethrough for allowing limited air flow through the panel.

16. A wind barrier as set forth in claim 14, wherein is included a number of spaced vertical cables and a number of spaced horizontal cables coupled to respective panels for reinforcing the panels, said vertical and horizontal cables being coupled by said coupling means to respective side cables coupled to respective helium balloons.

* * * * *